United States Patent
Borras

(10) Patent No.: US 11,401,033 B2
(45) Date of Patent: Aug. 2, 2022

(54) REMOTE SENSOR DATA ACQUISITION USING AUTONOMOUS DRONES

(71) Applicant: NOA, Inc., Miami Beach, FL (US)

(72) Inventor: Jaime Andres Borras, Miramar, FL (US)

(73) Assignee: NOA, Inc., Miami Beach, FL (US)

( * ) Notice: Subject to any disclaimer, the term of this patent is extended or adjusted under 35 U.S.C. 154(b) by 299 days.

(21) Appl. No.: 16/407,562

(22) Filed: May 9, 2019

(65) Prior Publication Data
US 2020/0354056 A1    Nov. 12, 2020

(51) Int. Cl.
*B64C 39/02* (2006.01)
*H04W 4/38* (2018.01)
*G05D 1/00* (2006.01)

(52) U.S. Cl.
CPC ......... *B64C 39/024* (2013.01); *G05D 1/0022* (2013.01); *G05D 1/0088* (2013.01); *H04W 4/38* (2018.02); *B64C 2201/126* (2013.01); *B64C 2201/141* (2013.01); *B64C 2201/148* (2013.01); *B64C 2201/18* (2013.01)

(58) Field of Classification Search
CPC ................................................... B64C 39/024
See application file for complete search history.

(56) References Cited

U.S. PATENT DOCUMENTS

| | | | |
|---|---|---|---|
| 2,645,940 A * | 7/1953 | Kohl | G01N 1/22 73/170.28 |
| 7,529,547 B2 * | 5/2009 | Twitchell, Jr. | H04W 52/0229 455/442 |
| 7,539,520 B2 * | 5/2009 | Twitchell, Jr. | H04W 76/20 455/343.1 |
| 10,861,305 B2 * | 12/2020 | Gordon-Carroll | G08B 13/19656 |
| 2006/0220839 A1 * | 10/2006 | Fifolt | A61B 5/0002 340/539.12 |
| 2006/0287822 A1 * | 12/2006 | Twitchell, Jr. | G01S 19/21 701/470 |
| 2007/0001898 A1 * | 1/2007 | Twitchell, Jr. | G01S 19/20 342/357.59 |
| 2007/0004330 A1 * | 1/2007 | Twitchell, Jr. | G01S 19/03 455/1 |
| 2007/0004331 A1 * | 1/2007 | Twitchell, Jr. | G01S 19/21 455/1 |
| 2011/0195699 A1 * | 8/2011 | Tadayon | H04W 48/02 455/418 |
| 2014/0024313 A1 * | 1/2014 | Campbell | H04B 1/3822 455/41.2 |

(Continued)

OTHER PUBLICATIONS

Google Machine Translation of EP3177531B1 to Wang (2014).*

*Primary Examiner* — Jean Paul Cass
(74) *Attorney, Agent, or Firm* — The Concept Law Group, PA; Scott M. Garrett; Scott D. Smiley

(57) ABSTRACT

An autonomous drone is programed with the geo-location of one or more remote sensors, and the autonomous drone then flies to each of the remote sensors to acquire a most recent sensing data record, and then return to a base where the most recent data record for each remote sensor can be transferred to a computing system. Upon arriving at the location of each remote sensor, the drone causes the remote sensor to activate a local area radio transceiver so that a communication link can be established between the drone and the remote sensor.

17 Claims, 11 Drawing Sheets

(56) References Cited

U.S. PATENT DOCUMENTS

| | | | | |
|---|---|---|---|---|
| 2015/0280811 A1* | 10/2015 | Singhal | ................ | H04W 40/20 |
| | | | | 455/431 |
| 2015/0356885 A1* | 12/2015 | Chen | ...................... | A23L 33/17 |
| | | | | 366/152.2 |
| 2016/0378109 A1* | 12/2016 | Raffa | .................... | H04N 5/232 |
| | | | | 701/2 |
| 2018/0134386 A1* | 5/2018 | Byers | ................... | G08G 5/0013 |
| 2018/0339687 A1* | 11/2018 | Albright | ................ | B60T 8/885 |
| 2019/0339687 A1* | 11/2019 | Celia | ...................... | H04L 67/12 |
| 2019/0369595 A1* | 12/2019 | Fievez | ...................... | G01P 5/02 |
| 2020/0145582 A1* | 5/2020 | Harada | ................. | G03B 15/00 |
| 2020/0180759 A1* | 6/2020 | Harada | ................. | H04L 67/06 |
| 2020/0410872 A1* | 12/2020 | Speasl | ................. | G08G 5/0034 |

* cited by examiner

REMOTE SENSOR DATA ACQUISITION USING AUTONOMOUS DRONES

GOVERNMENT INTEREST

This invention was made with government support under Grant No. IIP-1330943 awarded by the National Science Foundation. The U.S. Government has certain rights in the invention.

FIELD OF THE DISCLOSURE

The inventive embodiments of the disclosure relate to remote sensing systems, and more particularly to acquiring sensing data from remote sensing equipment using drones.

BACKGROUND OF THE DISCLOSURE

Remote sensing is commonly used to monitor environmental and other conditions and events at remote locations, or at least in situations where manned observation is impractical. For example, remote sensing is used to monitor water levels in canals, lakes, and rivers, allowing water management authorities determine when to open or close waterways, or otherwise adjust flow through waterways. It is also used for gathering rainfall, temperature, wind, and other data in remote locations. In some endeavors, remote sensing can include collecting photographic data, such as for monitoring and surveying wildlife populations. Furthermore, it is used in industry, particularly in power transmission where transmission lines can cross through remote areas to distribute power to populated areas.

There are conventionally two ways that data is acquired from remote sensors. The first is the use of radio transmitters to transmit data, and in some cases relay transmitted data, from a remote sensor to a base (headquarters, operating center, etc.). A transmitter requires a power source, such as a battery. In order for the transmitted signal to reach a destination with sufficient power to overcome noise, the power required to transmit the signal is significant when compared to the power otherwise required by the remote sensor to operate. In order to avoid frequent service visits, the battery must be fairly robust and rechargeable, which is accomplished using solar cells, typically. The transmitter circuitry must be designed to generate a signal of suitable power, and it must be weatherized, temperature tolerant, and so on. Finally, a suitable antenna is required that must be able to withstand environmental conditions, including wildlife activity. These features all greatly add to the cost of producing, siting, and maintaining a remote sensor.

A second way to acquire data from remote sensors is for personnel to travel to the sensor site and connect a device to or with the sensor and transfer data to the device. Although this arrangement simplifies the design of the remote sensing unit, it requires a person to travel to the remote sensing unit using a vehicle. Thus labor, vehicle expenses, and related expenses must be taken into account as part of the cost of operating such remote sensing units.

Therefore, a need exists to overcome the problems with the prior art as discussed above.

SUMMARY OF THE DISCLOSURE

In accordance with some embodiments of the present disclosure, there is provided a method for retrieving sensor data from a remote sensor that includes providing an autonomous drone aircraft with a geo-location of at least one remote sensor at a drone base, wherein the at least one remote sensor is fixed in place at the geo-location. The method can further include the autonomous drone aircraft flying to the geo-location, wherein the at least one remote sensor at the geo-location senses the presence of the autonomous drone aircraft. In response to sensing the presence of the autonomous drone aircraft, the at least one remote sensor wakes up a local wireless network radio transceiver. The method can further include establishing a communication link between the autonomous drone aircraft and the at least one remote sensor using the local wireless network radio transceiver of the at least one remote sensor and a local wireless network radio transceiver of the autonomous drone aircraft, and transmitting a most recent sensing data record stored at, and produced by, the at least one remote sensor to the autonomous drone aircraft wherein the most recent sensing data record is then stored in the autonomous drone aircraft. Thereafter, the autonomous drone aircraft returns to the drone base.

In accordance with another feature the method can include the at least one remote sensor detecting a sound of the autonomous drone aircraft that is produced by rotors of the autonomous drone aircraft.

In accordance with another feature the method can include the at least one remote sensor detecting a light signal from the autonomous drone aircraft.

In accordance with another feature the method can include the at least one remote sensor detecting a radio signal from the autonomous drone aircraft.

In accordance with another feature the method can further include providing a digital authentication key to the autonomous drone aircraft that corresponds to the at least one remote sensor, and the at least one remote sensor verifying the digital authentication key prior to transmitting the most recent sensing data record.

In accordance with another feature the method can include, upon arriving at the geo-location, the autonomous drone aircraft using a downward-facing camera and visually recognizing a marker associated with the at least one remote sensor; and the autonomous drone aircraft positioning itself over the marker.

In accordance with another feature, where the marker is disposed on a platform, the method can further include landing, by the autonomous drone aircraft, on the platform.

In accordance with another feature, upon landing on the platform, the method can further include the autonomous drone aircraft replacing a battery of the at least one remote sensor.

In accordance with another feature, the method can further include the autonomous drone aircraft confirming, to the at least one remote sensor, that a prior sensing data record has been recorded, and the at least one remote sensor deleting the prior sensing data record from a memory of the at least one remote sensor.

In accordance with another feature, the method can further include transmitting, from the at least one remote sensor to the autonomous drone aircraft, a present sensor status data record.

In accordance with some embodiments of the disclosure, there is provided a method for retrieving sensor data from a remote sensor by an autonomous drone aircraft that includes providing the autonomous drone aircraft with a geo-location of at least one remote sensor at a drone base, wherein the at least one remote sensor is fixed in place at the geo-location. The autonomous drone aircraft determines whether, based on a present battery charge and its present geo-location relative to the geo-location of the at least one remote sensor, the autonomous drone aircraft can fly to the at least one remote sensor and return to the drone base. When the autonomous drone aircraft has determined that it can fly to the at least one remote sensor and return to the drone base, the autonomous drone aircraft flies to the geo-location of the at least one remote sensor. Upon arriving at the location of the at least one remote sensor, the autonomous drone aircraft establishes a communication link between the autonomous drone aircraft and the at least one remote sensor using a local wireless network radio transceiver of the autonomous drone aircraft. The method can further include the autonomous drone aircraft receiving a most recent sensing data record stored at, and produced by, the at least one remote sensor, wherein the most recent sensing data record is then stored in the autonomous drone aircraft, and the autonomous drone aircraft returning to the drone base.

In accordance with a further feature of the method, prior to establishing the communication link, the autonomous drone aircraft provides a light signal to the at least one remote sensor to cause the at least one remote sensor to activate a local wireless network radio transceiver of the at least one remote sensor.

In accordance with a further feature of the method, prior to establishing the communication link, the autonomous drone aircraft provides a radio signal to the at least one remote sensor to cause the at least one remote sensor to activate a local wireless network radio transceiver of the at least one remote sensor.

In accordance with another feature of the method, establishing the communication link further includes providing a digital authentication key to the autonomous drone aircraft that corresponds to the at least one remote sensor, and transmitting the digital authentication key to the at least one remote sensor. Receiving the most recent sensor data record occurs responsive to transmitting the digital authentication key.

In accordance with a further feature of the method, the autonomous drone aircraft flying to the geo-location includes, upon arriving at the geo-location, using a downward-facing camera and visually recognizing a marker associated with the at least one remote sensor, and the autonomous drone aircraft positioning itself over the marker.

In accordance with a further feature of the method, the marker is disposed on a platform, the method further includes landing, by the autonomous drone aircraft, on the platform.

In accordance with a further feature of the method, upon establishing the communication link, the autonomous drone aircraft transmits to the at least one remote sensor an indication that a prior sensing data record has not been recorded, and the autonomous drone aircraft then receives the prior sensing data record from the at least one remote sensor.

In accordance with a further feature of the method, the autonomous drone aircraft confirms, to the at least one remote sensor, that a prior sensing data record has been recorded.

In accordance with a further feature of the method, the method further includes receiving, at the autonomous drone aircraft, a present sensor status data record.

In accordance with a further feature of the method, wherein, upon autonomous drone aircraft determining whether the autonomous drone aircraft can fly to the at least one remote sensor and return to the drone base, the autonomous drone aircraft initially determines that it cannot fly to the at least one remote sensor, and then waits until the present battery charge is sufficient to fly to the at least one remote sensor and return to the drone base.

Although the disclosure is illustrated and described herein as embodied in a method and system for the acquisition of remote sensing data by an autonomous drone, it is, nevertheless, not intended to be limited to the details shown because various modifications and structural changes may be made therein without departing from the spirit of the disclosure and within the scope and range of equivalents of the claims. Additionally, well-known elements of exemplary embodiments of the disclosure will not be described in detail or will be omitted so as not to obscure the relevant details of the disclosure.

Other features that are considered as characteristic for the disclosure are set forth in the appended claims. As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure. Further, the terms and phrases used herein are not intended to be limiting; but rather, to provide an understandable description of the disclosure. While the specification concludes with claims defining the features of the disclosure that are regarded as novel, it is believed that the disclosure will be better understood from a consideration of the following description in conjunction with the drawing figures, in which like reference numerals are carried forward. The figures of the drawings are not drawn to scale.

Before the present disclosure is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present disclosure, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure. Furthermore, terms such as "first", "second", "third" and so on are only used for descriptive purposes, and cannot be construed as indicating or implying relative importance.

In the description of the embodiments of the present disclosure, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the terms "program," "software application," "instruction code," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Furthermore, various methods are illustrated in flow chart diagrams which have a linear flow, but those skilled in the art will appreciate that the process represented as steps in those methods can be performed while other processes are also being carried out and performed by the same device, such as in a background or a foreground process. Thus, the linear nature of the flow chart diagrams is not to be taken as an indication that the process must be performed linearly. Those skilled in the art can understand the specific meanings of the above-mentioned terms in the embodiments of the present disclosure according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

DETAILED DESCRIPTION

Figure 1:
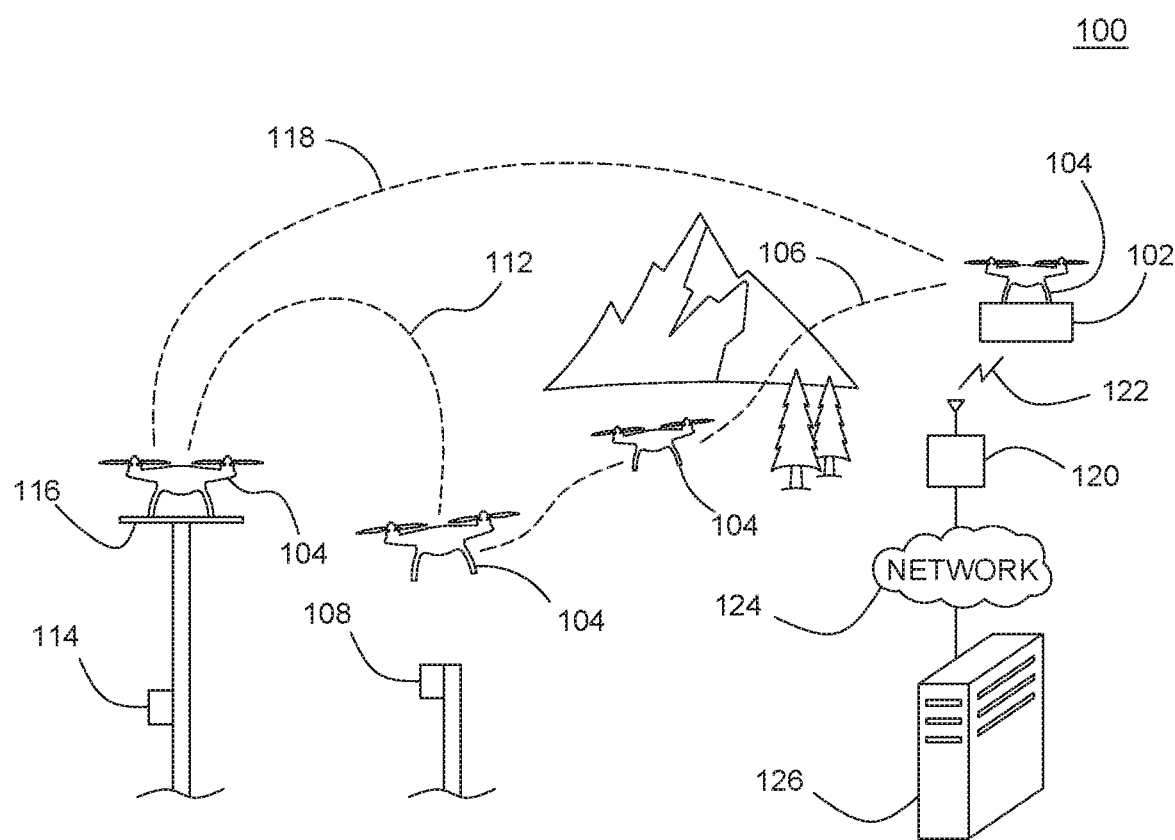
FIG. 1 is a system diagram of a remote sensor system using drones to collect sensor data from remote sensor sites, in accordance with some embodiments.

While the specification concludes with claims defining the features of the disclosure that are regarded as novel, it is believed that the disclosure will be better understood from a consideration of the following description in conjunction with the drawing figures, in which like reference numerals are carried forward. It is to be understood that the disclosed embodiments are merely exemplary of the disclosure, which can be embodied in various forms. The present disclosure provides a novel and efficient remote sensing system that uses autonomous drone aircraft to retrieve sensing data from remote sensing sites.

FIG. 1 is a system diagram of a remote sensor system 100 using drones to collect sensor data from remote sensor sites, in accordance with some embodiments. In general, the system 100 can include one or a plurality of remote sensors that can be located in a variety of terrain, including undeveloped wild areas, urban areas, and areas in between those. A drone base 102 can be the starting and ending point for an autonomous drone aircraft 104 (hereafter simply "drone"), and can be a mobile base or a fixed base. The drone 104 is configured to fly autonomously to various remote sensor sites and retrieve sensing data from those sites. In order to accomplish that, the drone 104 includes a variety of navigational sub-systems, including, for example, a satellite positioning system receiver, altimeter (which can be provided as an output by the satellite positioning system), accelerometer, and so on.

Prior to departing, the drone 104 is provided with the geo-location of one or more remote sensing sites. The drone 104 can also be provided with digital authentication keys for each of the remote sensors that are presented and verified by the remote sensors in order to receive sensor data from the remote sensors. To communicate with the drone 104 the drone 104 can include a wireless local area network (WLAN) transceiver that can operate according to specification 802.11 of the Institute of Electrical and Electronics Engineers (IEEE), which includes the air interface protocol known as WiFi. A connection 122 can be established between the drone 104 and an access point 120 that can be further communicatively connected to a network 124, such as the Internet. Thus, geo-location points corresponding to remote sensor site can be transferred from the access point 120 to the drone 104. The remote sensors are fixed in place, and their geo-location is known prior to commencing the operation. The geo-location points can be selected by a user and they can be evaluated to ensure that the drone 104 can actually fly the required distance. The drone 104 can, itself, make that determination based on the remaining battery charge of its battery or batteries. In some embodiments the base 102 can act as a charging station, and the drone 104 can wait until its battery is sufficiently charged to compete the tasked journey.

Once the drone 104 is ready to depart, it leaves autonomously as indicated by line 106, and can fly to the location (as indicated by the provided geo-location) of a first remote sensor 108. The first remote sensor 108 is a simple sensor that provides no landing platform, and as a result the drone 104 must hover over the sensor 108, as indicated by line 110. The drone 104 needs only be within WLAN range of the sensor 108 to receive data wirelessly, but the drone 104 must make its presence known or otherwise be detected by the sensor 108. One way for the sensor 108 to detect he drone 104 is by detecting a radio beacon transmitted by the WLAN transceiver of the drone 104. However, that requires the sensor 108 to likewise have a WLAN transceiver operating, which draws power, and in some embodiments it can be desirable to keep the WLAN transceiver of the sensor 108 powered off until needed. In some embodiments the drone 104 can fly according to a schedule, and the sensor 108 can activate its WLAN transceiver only for the scheduled time. In some embodiments, the sensor 108 can detect the presence of the drone 104 in other ways, such as by detecting a characteristic sound made by the drone 104, or by the drone 104 signaling with a light source to a photodetector at the sensor 108. When detecting the drone 104 by these other processes (other than using WLAN to detect a WLAN beacon from the drone), the sensor 108 can then power up its WLAN transceiver and transmit a beacon that is detected at the drone 104, whereupon the drone 104 and sensor 108 can commence communicating over a WLAN link.

Upon establishing the WLAN link, the drone 104 can transmit a digital authorization key to the sensor 108, and upon verifying the digital key, the sensor 108 can then transmit a current or present sensing data record. The sensing data can include any manner of data acquired by sensing transducers, including values over time of some quantity being sensed, images captured and times at which the images were captured, and so on. In some embodiments the drone 104 may also request an older record that the sensor 108 has stored. The older record can be a previously produced record that had been acquired by a drone, but which had become corrupted and needs to be acquired again. In some embodiments the drone 104 can indicate to the sensor 108 that the older record(s) have been successfully transferred to a server (e.g. 126) and can be deleted from the sensor 108.

Once the drone 104 is finished at sensor 108, it can then fly to a second sensor site as indicated by line 112, where sensor 114 is located. Sensor 114 is mounted in association with a platform 116 on which the drone 104 can land to save battery charge while communicating with sensor 114. The drone 104 can use visual recognition to identify the platform 116 and land on the platform 116. Some indicia can be provided on the top of the platform 116 to aid in the recognition process. The process for communicating with sensor 114 can be substantially similar to that used to communicate with sensor 108. Assuming sensor 114 is the last sensor to be visited, then after receiving the requested data from sensor 114 the drone 104 can return to the base 102 as indicated by line 118. Once back at the base 102, the drone 104 can again connect with the access point 120 in order to relay the various sensing data records it has acquired from the sensors (108, 114) to a server 126, where the data can be further processed. The sensing data records can include metadata indicating the date/time when the data was acquired, as well as the sensor identifier of the sensor that produced the data.

Figure 2:
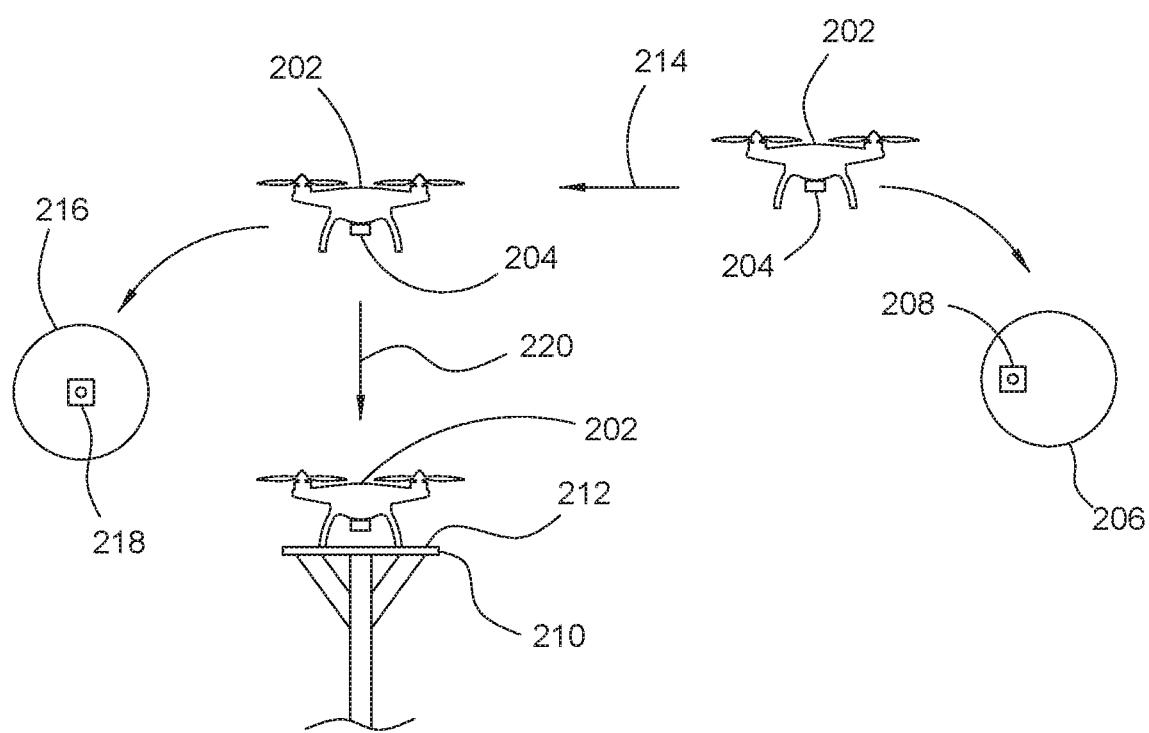
FIG. 2 is a diagram showing a drone landing on a platform of a remote sensing site to acquire sensing data, in accordance with some embodiments.

FIG. 2 is a diagram 200 showing a drone 202 landing on a platform 210 of a remote sensing site to acquire sensing data, in accordance with some embodiments. When the drone 202 arrives at the approximate location of the sensing site, as indicated by the geo-location information (e.g. latitude and longitude coordinates), the drone 202 can activate a downward-facing camera 204 to perform a visual recognition process. As the drone 202 approaches the sensing site, the camera can produce a view 206 in which the top 212 of the platform 210 appears in the image in location 208 of the view 206. By processing the image data of view 206, the drone 202 can determine that the drone 202 needs to move, and the direction to move, so that the platform 210 appear in the center of the view of the camera 204. Thus the drone 202 can move, as indicated by arrow 214, to produce view 216 in which the image of the top 212 of the platform 210 appears at location 218. When the drone 202 is directly over the platform 210, the drone 202 can lower itself as indicated by arrow 220 to land on top of the platform 210. Once landed, the drone 202 can commence communicating with the sensor.

Figure 3:
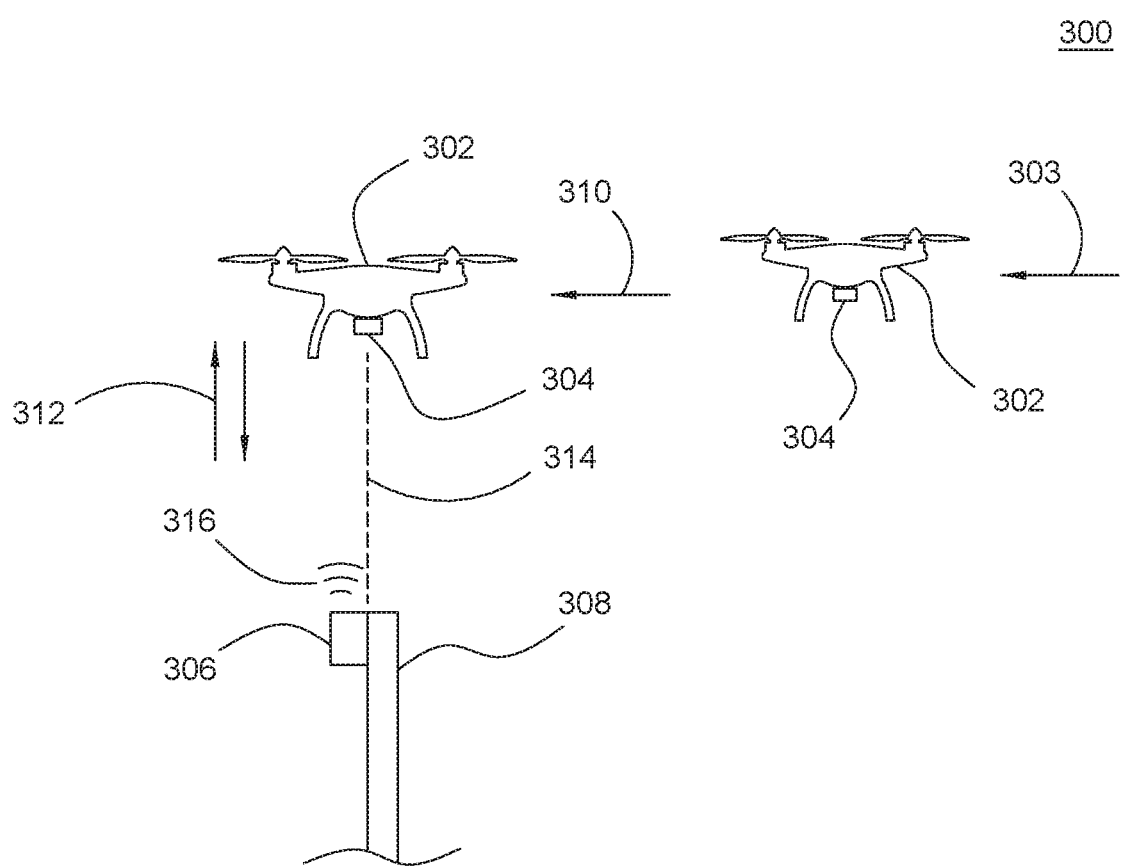
FIG. 3 is a diagram showing a drone hovering at a remote sensing site to acquire sensing data, in accordance with some embodiments.

FIG. 3 is a diagram 300 showing a drone 302 hovering at a remote sensing site to acquire sensing data, in accordance with some embodiments. The drone 302 can arrive to the approximate location of the sensing site as indicated by arrow 303. The drone 302 can have a camera 304 to identify or visually recognize some indicia provided at the sensing site to confirm that the drone 302 is in the proper location. As in FIG. 2, the drone 302 can move until it is sufficiently over the sensor 306 as indicated by arrow 310. The sensor 306 can be mounted on some object 308, such as a pole, a tree, a building, or any other object at which providing a platform is impractical or otherwise undesirable (including cost). Once over the sensor 306, as indicated by line 314, the sensor can adjust its height if necessary, as indicated by arrows 312. In some embodiments the sound made by the drone 302 in oscillating up and down can be detected by the sensor 306, causing the sensor 306 to wake up its WLAN transceiver for communication with the drone, as indicated by radio signals 316. Thereafter, the drone 302 and sensor 306 can communicate, and sensing data record(s) can be communicated to the drone 302. The drone 302 can then depart and interact with other sensors or return to a base.

Figure 4:
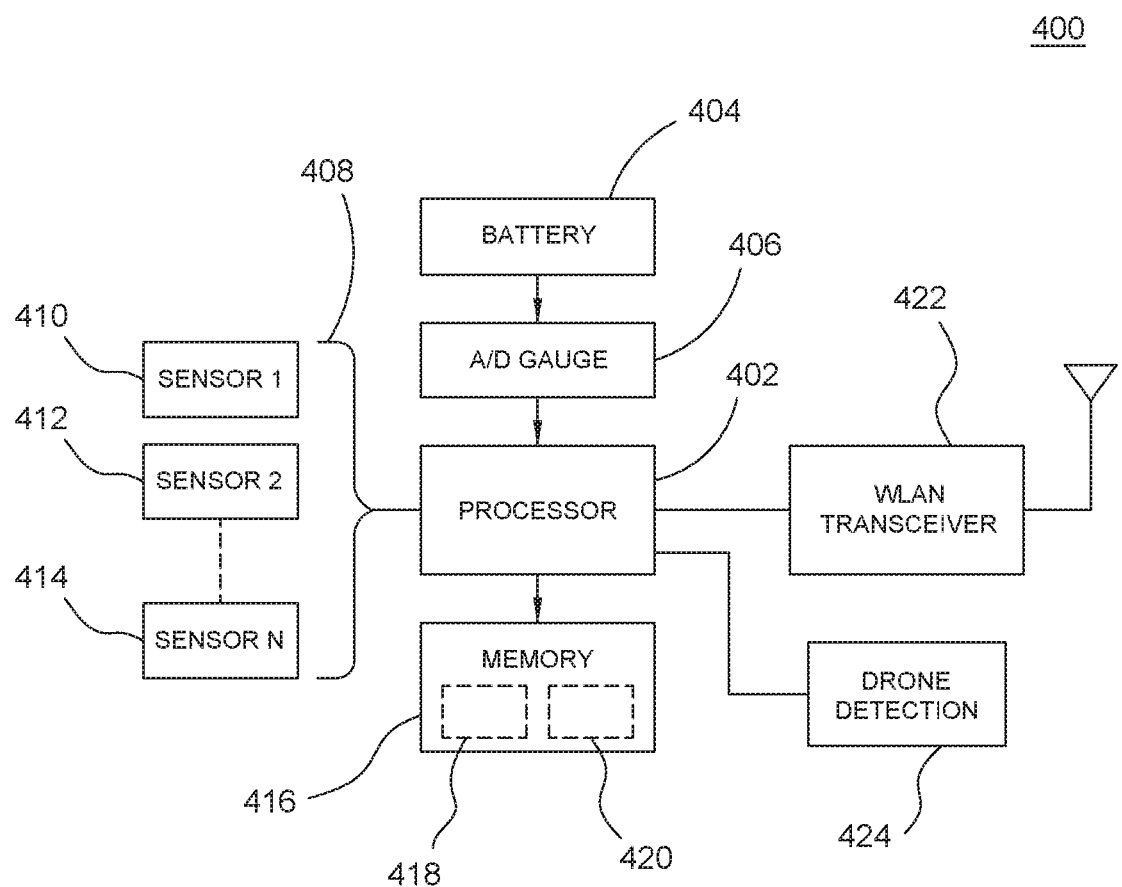
FIG. 4 is a block schematic diagram of a remote sensor, in accordance with some embodiments.

FIG. 4 is a block schematic diagram of a remote sensor 400, in accordance with some embodiments. The remote sensor 400 shown here is one example of a remote sensor, and those skilled in the art will appreciate that there are numerous variations in architecture and in implementation details that can be used in the general design of a device for remote sensing. In the exemplary design of remote sensor 400 a processor 402 is used to control and operate various subsystems of the remote sensor, as well as to process and archive sensing data. The processor 402 is operably coupled to memory 416 which, here, is abstracted to include a variety of memory devices, which can include, for example, bulk storage, read only memory (ROM), random access memory (RAM), flash memory, and so on. Generally, the memory serves three functions, which are the storage of instruction code that is to be performed by the processor; instantiation memory in which instruction code is instantiated for running, as well as for variables, times, and other data structures that can change in the course of performing the instruction code; and storage memory for storing sensing data. The storage memory, in some embodiments, can include redundant memory elements in order to safeguard data in the event of a memory failure. In some embodiments the remote sensor 400 can store one or more data sets; a most recent sensing data record 418 and (a) prior sensing data record(s) 420. Each of the data records 418, 420 include sensing data produced by sensors 408, which can include several different sensor transducers 410, 412, 414 for converting physical measurements, images, sounds, or other sensed phenomena, into electrical signals, and then into data, as processed by the processor 402. Various phenomena can be sensed, such as, for example, temperature, water level, humidity, solar irradiance, wind direction and speed, barometric pressure, counts of occurrences of an event (e.g. automobile crossings), among many others, as are known. Further, sensors 408 can be used to capture images and/or sounds in response to sensing an occurrence of some event. All of the collected data can be organized into sensing data records where the data is organized chronologically. Each sensing data record 418, 420 can represent data acquired and processed by the remote sensor between times when the data was picked up (e.g. transferred to another entity such as a drone). Thus, the most recent sensing data record 418 is a data record that is being added to as sensing continues, and was started at the last time data was transferred to another entity. The prior sensing data record 420 represents data that was sensed and processed in a prior sensing period that has been transferred to another entity but is kept as a backup safeguard in case the data transferred to the other entity became corrupted, so that it can be accessed again. As part of the memory management, each time an entity interacts with the remote sensor 400, it can indicate whether or not the prior sensing data record 420 can be deleted, indicating it was successfully transferred to the end user (e.g. server 126 of FIG. 1).

In order to communicate, the remote sensor 400 can include a WLAN transceiver 422. The WLAN transceiver can operate according to IEEE specification 802.11 or an equivalent that supports bi-directional radio communication using low power. The WLAN transceiver 422 includes a baseband processor that performs modulation and demodulation to send and receive data. The processor 402 can act as an application processor for carrying out operations of the WLAN transceiver 422. The WLAN transceiver 422 is generally kept in a sleep or low power mode to conserve battery charge (of battery 404), but can be selectively powered up under control of the processor 402. In some embodiments the WLAN transceiver 422 is periodically powered up to detect any WLAN transmissions (e.g. a beacon signal from a drone). In some embodiments arrival of a drone can be scheduled to occur at a specific time or time range, and the periodic enabling of the WLAN transceiver 422 can be performed only in that scheduled time range.

In some embodiments a drone can be detected using another means in the drone detection block 424. For example, the drone detection block can include a microphone and an audio recognition processor that recognizes a sound made by a drone while flying (e.g. the sound of the rotors). In some embodiments the drone detection block can include a photosensor used to detect a light signal from a light source of a drone. For example, a drone can flash a light source in a known pattern that can be detected by a photosensor. A photosensor or high gain microphone can be configured such that a sufficient light or sound, respectively, can be used to wake up other portions of the detection circuitry to verify the presence of the drone. For example, a comparator circuit can be used to generate an interrupt to the processor 402, which can in turn cause other circuitry to be enabled. Upon detecting the likely presence of a drone, the processor 402 can also power up the WLAN transceiver 422 to commence communicating with the drone.

The remote sensor 400 and the associated circuitry and components are powered by a battery 404, which can be a rechargeable battery. In some embodiments a recharging circuit (not shown) can be used to keep the battery 404 charged. Many examples of recharging circuits are known, including, for example, those using solar cells to convert light to electricity. A gauge circuit 406 can be used to determine the present state of charge of the battery 404 and to identify any problems with the battery. In some embodiments the battery 404 can include a backup battery in case one battery suffers a failure. In some embodiments the battery 404 can be replaced by a drone.

Figure 5:
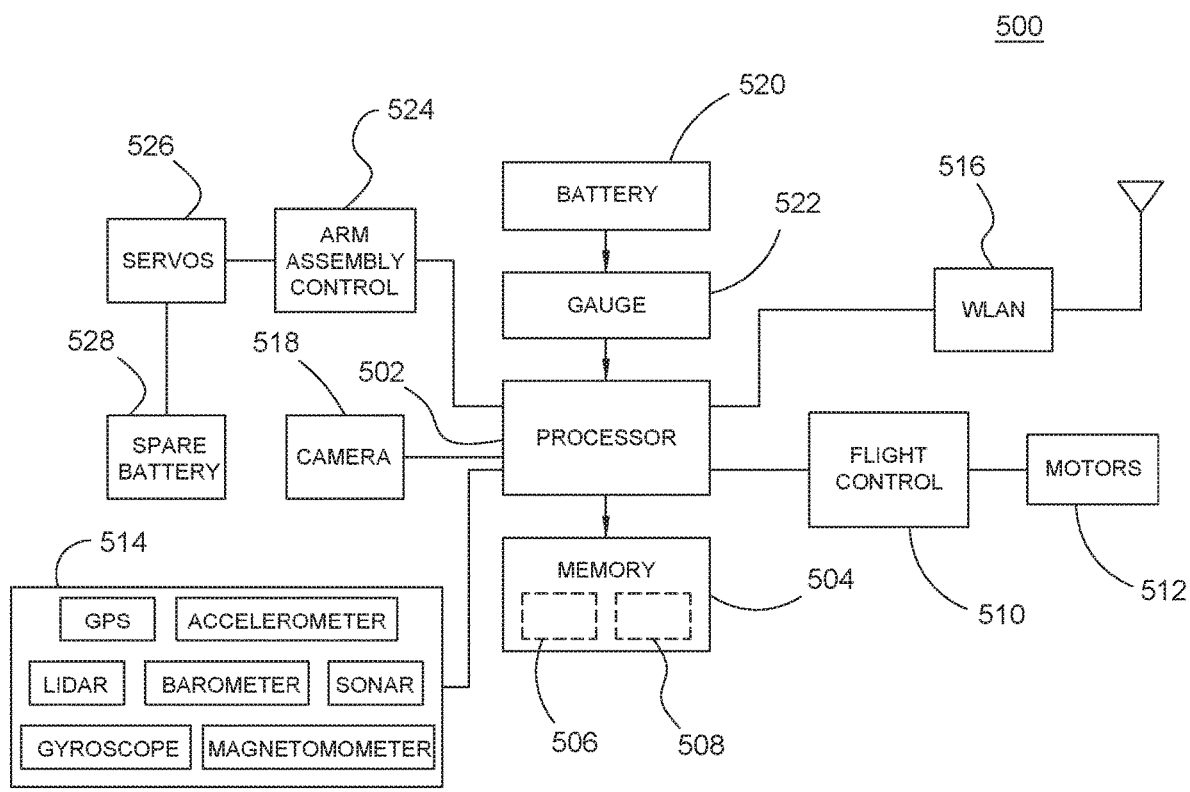
FIG. 5 is a block schematic diagram of a drone configured to autonomously acquire sensing data from remote sensing sites, in accordance with some embodiments.

FIG. 5 is a block schematic diagram of a drone 500 configured to autonomously acquire sensing data from remote sensing sites, in accordance with some embodiments. The drone 500 is configured to autonomously fly to one or more selected remote sensor locations and acquire sensing data that has been produced by the remote sensor, and then to return and transfer the collected sensing data to a repository for further processing. Accordingly, the drone 500 includes one or more processors such as processor 502 which performs instruction code designed to operate the drone in the various tasks it has to perform. The processor 502 is coupled to memory 504, which can be an aggregate of various forms of memory, including ROM, RAM, flash memory, and other memory elements. In addition to storing sensing data acquired from the various remote sensors the drone 500 visits, the memory 504 also particularly includes geo-location information 506 and authentication keys 508. The geo-location information 506 is the location information, such as coordinates in latitude and longitude, of a given remote sensor to be visited by the drone 500. The authentication keys are one or more digital data structures used by the remote sensors to verify that the drone is authorized to receive sensing data. The authentication keys can be a simple password/passphrase or something more sophisticated such as an encrypted certificate using asymmetric encryption such as public key/private key encryption.

The drone 500 includes a flight control system 510 that operates several motors 512 used to power the rotors. The rotors can be controlled to spin at different speeds to accomplish directional changes, as is known. Flight is controlled using several navigation systems 514, which can include multi-dimensional accelerometers, magnetometer (compass), altimeter/barometer, and GPS (satellite positioning) for gross navigation. The navigation can further include systems for finer navigation such as LIDAR and SONAR, and a camera 518 can be used for visual recognition of objects related to navigation. A gyroscope can be included for flight stability as well. All of the various navigational components produce output that can be used by the processor to control flight of the drone 500 to the various remote sensing sites, as well as what to do at a given site (e.g. hover, land). Once the drone 500 has arrived at a specified remote sensing site, and has been detected by the remote sensor, the drone 500 can use a local wireless network transceiver 516 (or equivalent) to communicate with the remote sensor.

One critical aspect of flight is the flight time, which is depending on the battery 520 and the present charge level of the battery 520. When the drone is tasked with visiting one or more remote sensor sites, the drone 500 uses the geo-locations of those sites and its present location to determine whether it can complete the trip. In addition to flight time, the drone has to also use estimates for the time it may have to hover near a remote sensor site, even if a given site include a landing platform. A fuel gauge circuit 522 can be used to track charge in/out of the battery and determine a capacity of the battery and current charge level.

It is further contemplated that, in some embodiments, the drone 500 can replace a battery of a remote sensor. A spare or replacement battery 528 can be carried by the drone 500. Upon landing at a remote sensor site, the battery 528 can be manipulated using articular arms 524 that are controlled and operated by servo motors 526. The camera 518 may be used to facilitate recognition of a present battery and battery socket at the remote sensor that must first be removed, and the new battery then placed into the battery socket or connector so that it can then be used by the remote sensor. The removed battery can then be carried by the drone 500 back to a base for service or recycling.

Figure 6:
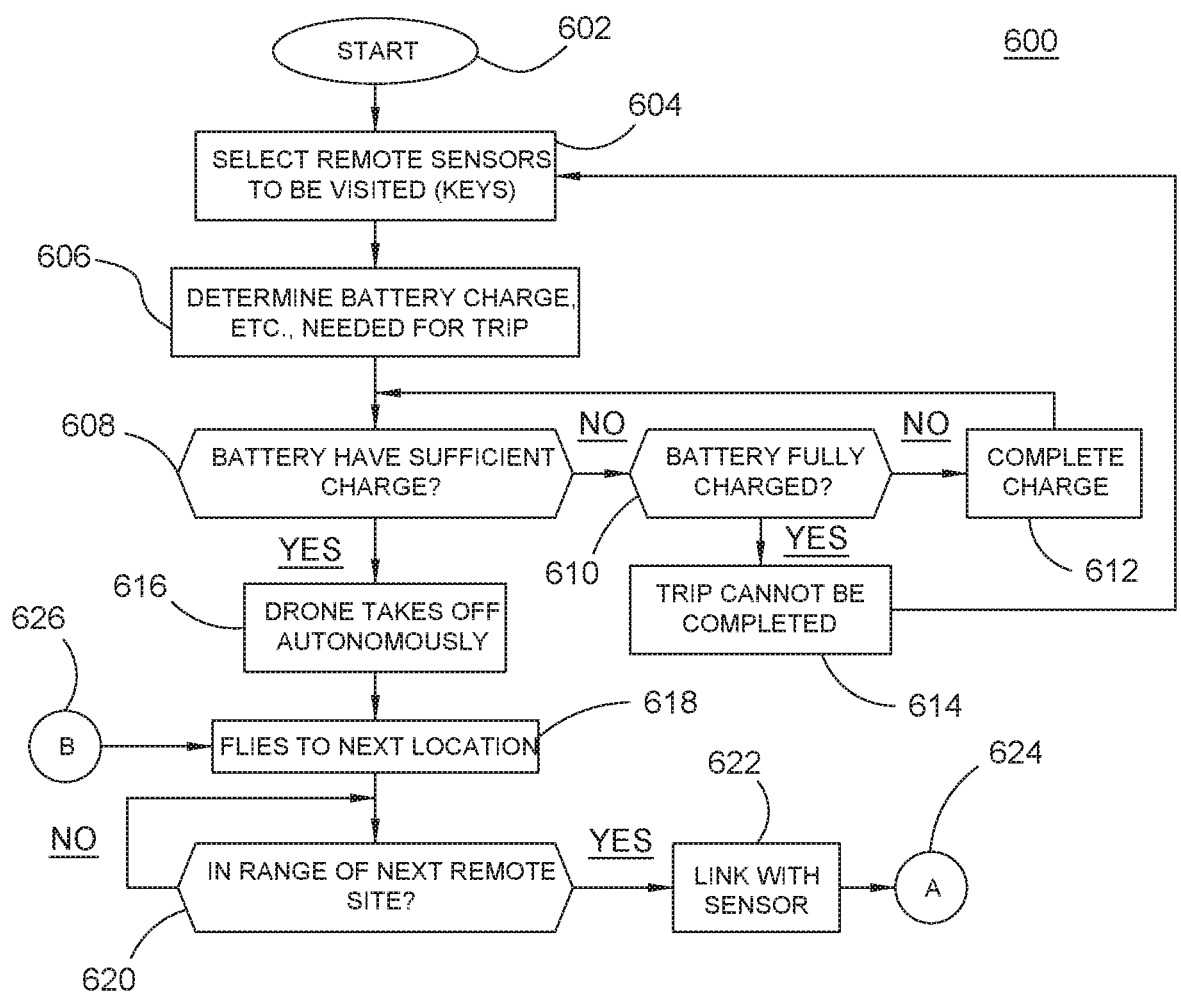
FIG. 6 is a flow chart diagram of a method for operation of an autonomous drone aircraft in acquiring sensing data from one or more remote sensing sites, in accordance with some embodiments.

FIG. 6 is a flow chart diagram of a method 600 for operation of an autonomous drone aircraft in acquiring sensing data from one or more remote sensing sites, in accordance with some embodiments. At the start 602, an autonomous drone aircraft is provided that is ready for flight, and that is connected to another computing device, either directly or by a network (wired or wireless) connection. In step 604 a selection of remote sensor sites to be visited is provided to the autonomous drone aircraft, including location coordinates of each of the selected remote sensors. In some embodiments a digital authentication key for each of the selected remote sensors can be provided to the autonomous drone as well in step 604. In step 606 a determination is made, based on present battery charge of the autonomous drone's battery, and its present geo-location relative to the geo-location(s) of the remote sensor(s), as to the battery charge needed for the autonomous drone to complete trip, as well as any other aspects of feasibility of the trip. The determination of step 606 can first determine the shortest flight path required to visit all of the selected remote sensor locations, and then a time required at each remote sensor location to acquire sensing data is estimated. In some embodiments there can be an indication given as to whether each remote sensor location has a landing platform or not. Those remote sensor locations that have a landing platform can allow the drone to acquire sensing data without substantially consuming battery charge, which can prolong the battery charge more than in cases of those remote sensor locations that do not have landing platform. Furthermore, wind speed and direction can be ascertained and used to adjust the estimation of flight time. In step 608 a decision is made; if the drone's battery charge presently is sufficient to complete a trip visiting all of the selected remote sensor locations, including a sufficient estimation error, the method 600 proceeds to step 616 where the drone automatically departs, and in step 618 the drone flies to the first or next remote sensor site location. In step 620, the drone monitors its location relative to that of the next remote sensor location, and when it is within communication range it proceeds to step 622 to link with the remote sensor and commence communicating. The method 600 can then proceed to method 700 as indicated by block 624. Indefinite looping in step 620 is prevented by checking mission abortion criteria, for example the mission can be aborted and the drone would commence a return trip if its remaining battery charge has decreased to the level required for the return trip plus a safety margin.

In step 608, if the drone's battery charge is not presently sufficient to complete the necessary journey to visit all selected remote sensors, then in step 610 the method 600 determines if the battery is fully charged. If not, and the drone estimates that a fully charged battery may suffice for trip, then in step 612 the drone can wait until the battery is done charging. If the battery is fully charged in step 610 or the drone estimates that a fully charged battery may not suffice for trip, then in step 614 it is determined that the requested trip cannot be completed, and the method 600 returns to step 604 to revise the remote sensor selection hopefully to a journey that can be completed, or to await further assignments. This process of method 600 therefore allows for variations such as the effect of wind, battery aging, and so on. In some embodiments the drone can include a solar cell array that can be used to supplement battery charge while in flight. Thus, on sunny days the effect of a solar cell array can allow for a journey that maybe cannot be completed at night or on less sunny days.

Figure 7:
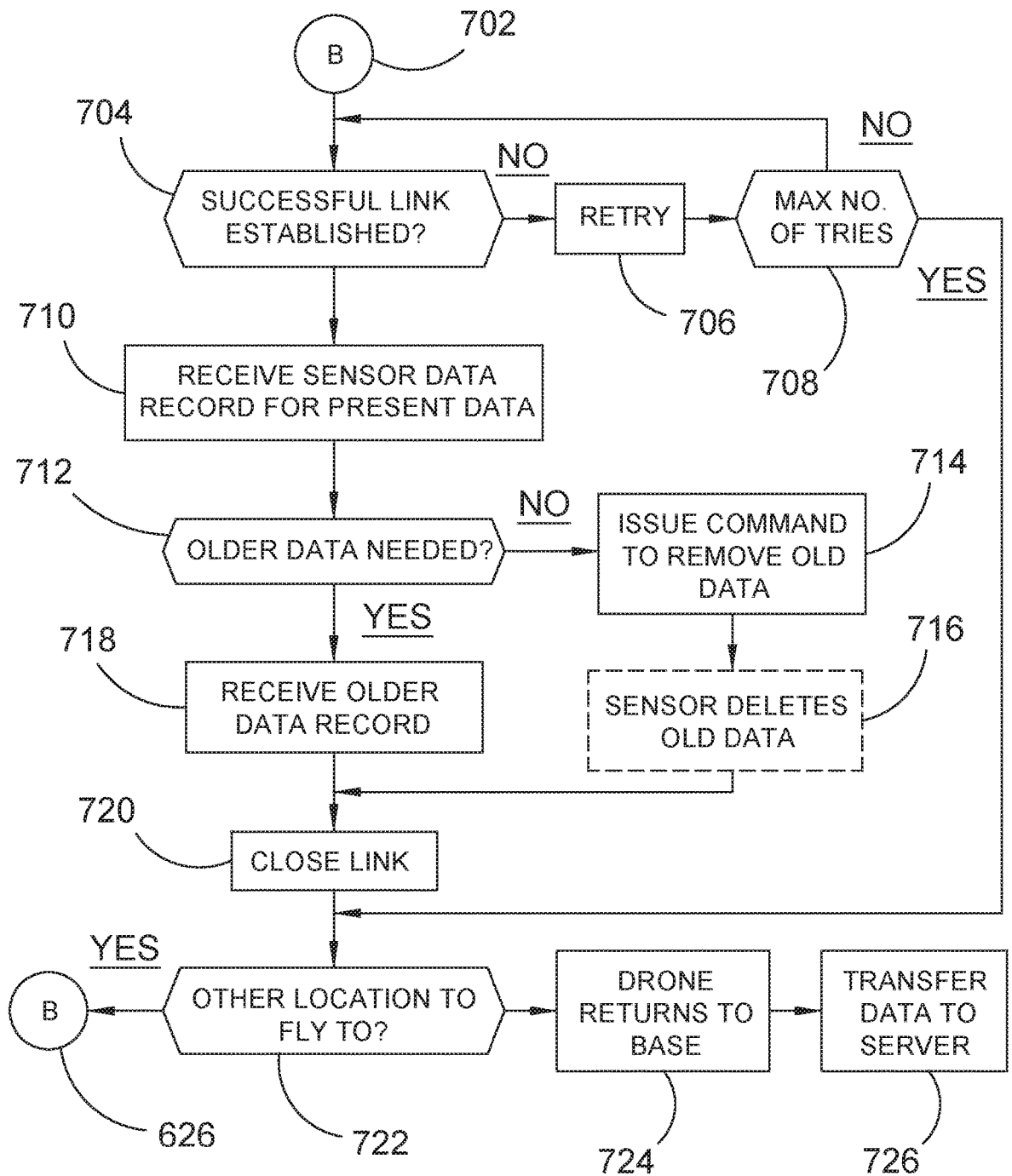
FIG. 7 is a flow chart diagram of a method for interacting with an autonomous drone by a remote sensor, in accordance with some embodiments.

FIG. 7 is a flow chart diagram of a method 700 interacting with an autonomous drone by a remote sensor, in accordance with some embodiments. The starting point 702 is a continuation from the method 600 of FIG. 6, in the situation where the autonomous drone has arrived at the location of a remote sensor. In some embodiments, where the remote sensor location has a landing platform, the drone can land on the platform using a visual recognition process (e.g. as described in FIG. 2). In embodiments where there is no landing platform, the drone can hover at a selected height or altitude, or circle the area while attempting to establish communications with the remote sensor. The drone enters method 700 attempting to establish a communication link with the remote sensor. In some embodiments, the remote sensor maintains its wireless network transceiver in a sleep mode, and detects the presence of the drone passively, such as by detecting a characteristic sound made by the drone. The characteristic sound can simply be the sound of the drone's rotors, or the drone can play an acoustic signal via an audio transducer on the drone that can be detected by the remote sensor at a microphone of the remote sensor. In some embodiments, the remote sensor can periodically wake up its wireless network transceiver, transmit a beacon, and wait for a response. In some embodiments the beaconing can be done only at scheduled periods, with the remote sensor maintaining the wireless network transceiver off outside of the scheduled periods.

In step 704 the method 700 determines whether a communication link has been established between the drone and the remote sensor. While attempting to establish the communication link, the method 700 can cycle through steps 706 and 708 to return to 704. In step 706 the drone continues attempt to establish the communication link. In step 708, the method 708 can establish some exit criteria, such as a maximum number of attempts, or a time period that has elapsed during which no communication link has been established. In some embodiments the exit criteria can include an initial communication link being established, followed by the drone presenting/transmitting an authentication key to the remote sensor. If the remote sensor verifies the authentication key, then the method can proceed to step 710, otherwise failure to authenticate is considered an exit criterion and the method proceeds to step 722. Likewise, if any other the exit criteria has been met, without being able to establish communication, then the method proceeds to step 722.

In step 704, when the drone and the remote sensor are able to establish communications, the method 700 proceeds to step 710 where the remote sensor transmits a sensing data record to the drone. The sensing data record can be a most recent sensor data record. In some embodiments, the drone may also require a prior or past sensing data record if the past sensing data record was not able to be delivered to the base on a previous attempt by a drone as indicated by step 712. When the older sensing data record is also needed, the remote sensor can transfer the prior sensing data record to the drone over the communication link in step 718. In some embodiments, where the prior sensing data record has been previously transferred successfully, the drone can issue a command or message to the remote sensor in step 714 to delete the old sensing data in order to free up memory in the remote sensor. In step 716 the remote sensor can then delete the old sensing data and archive the present sensing data record (which then becomes the prior sensing data record in further iterations of the method 700). Said deletion can be a virtual deletion, such as marking the containing memory locations as available for reuse if and when needed to store new data. In some embodiments, the remote sensor can further provide a present sensor status data record that includes various operational parameters of the remote sensor, such as, for example, an error log, battery status, any signal or power level anomalies, and so on. In step 720, all of the communications and data transfer have been completed. The drone can confirm receipt of the sensing data record(s) with a checksum or other known verification technique that can be confirmed by the remote sensor. The communication link can then be closed.

In step 722 the method 700 determines whether there are other remote sensor locations to be visited, and if so, then the method 700 returns to method 600 at 626. When, in step 722, there are no other remote sensor locations to visit, then in step 724 the drone can return to the base, or some other location at which the drone can then transfer all of the acquired sensing data records in step 726 to a server (e.g. 126) using a method such as that of FIG. 9. The drone can then charge its battery and subsequently be later tasked with another flight trip for carrying out methods 600, 700.

Figure 8:
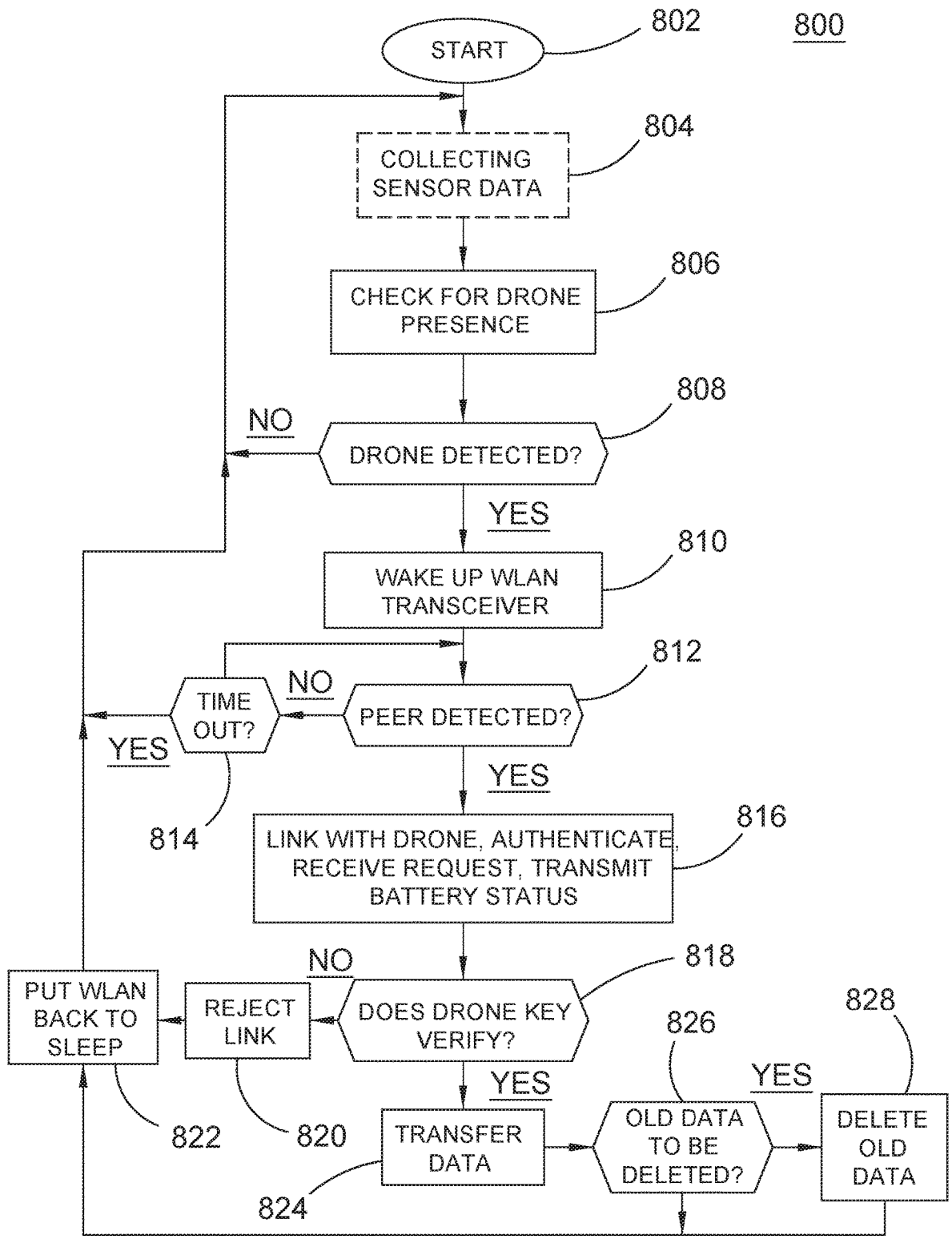
FIG. 8 is a flow chart diagram of a method for operating a remote sensor, in accordance with some embodiments.

FIG. 8 is a flow chart diagram of a method 800 for operating a remote sensor, in accordance with some embodiments. At the start 802, the remote sensor has been sited and established, meaning any and all sensors/transducers have been properly deployed and are able to acquire data. A power source is available to operate the remote sensor, and in general the remote sensor is operating, and recording data produced by it sensors/transducers in step 804. As part of its operation, the remote sensor, in step 806, is configured to detect the presence of a drone. This can be done by, for example, detecting a sound made by a drone (rotors or an acoustic signal), light (e.g. pulses/flashes), or by wireless beacons. Generally, the remote sensor maintains its wireless network transceiver in a low power (disabled) state to conserve battery power. However, in some embodiments the remote sensor can periodically wake up the receiver to listen for a radio beacon from a drone, or in some embodiments, the remote sensor can transmit a beacon during short scheduled periods, outside of which the wireless network transceiver is maintained in the low power state. After transmitting a beacon, the remote sensor can then listen for a response.

In step 808 the remote sensor determines if a drone has been detected in a loop back to step 804. When a drone seems to have been detected, then in step 810 the remote sensor wakes up its wireless network transceiver, and in step 812 attempts to detect a wireless peer (e.g. the drone's wireless network transceiver). When the peer is detected, then in 816 a link can be established using wireless radio communication according to an established air interface protocol (e.g. IEEE 802.11). In steps 816, 818, an optional authentication process can be carried out where the drone presents an authentication key that the remote sensor can validate. If the drone cannot be authenticated, then in step 820 the communication link is rejected. When the drone is authenticated by the remote sensor, or when authentication is not required, the method 800 proceeds to step 824 where the most recent sensing data record is transmitted to the drone. In step 826 the drone can indicate whether older sensing data is also needed, or whether the older sensing data can be deleted by the remote sensor in step 828. Once the interaction with the drone is complete, then in step 822 the wireless network transceiver of the remote sensor is put back into a low power state and the remote sensor then continues acquiring sensing data in step 804.

Figure 9:
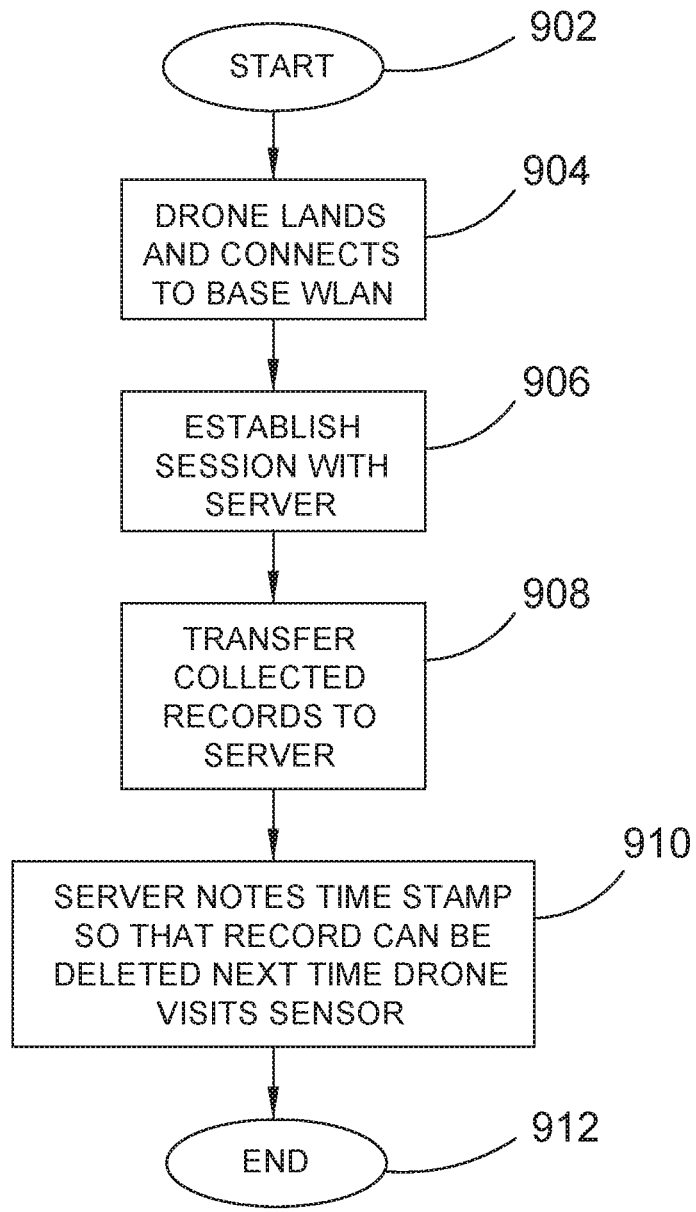
FIG. 9 is a flow chart diagram of a method for transferring acquired data from an autonomous drone to a server, in accordance with some embodiments.

FIG. 9 is a flow chart diagram of a method 900 for transferring acquired data from an autonomous drone to a server, in accordance with some embodiments. Method 900 is performed once the drone has returned to a base, or landed at another destination where it can communicate with the server (e.g. 126 of FIG. 1). Thus, at 902 the drone flies back to the base or a similar destination, and in step 904 the drone lands at the base or other destination. In step 906, then, the drone can establish communication with the server. For example, the drone can use its wireless network transceiver to link with an access point or similar networked communication equipment. The drone can access a URL or another identifier for the server which the server uses to receive data. In step 908 the drone can then transmit all acquired sensing data records to the server. Each sensing data record can include metadata indicating the remote sensor that produced the data, the time period (dates and times) over which the sensing data was acquired by the indicated remote sensor, and so on. In step 910 the server accepts the sensing data records, and notes that, in future visits to the remote sensor that produced a given sensing data record, the old sensing data record can be deleted. Once all of the acquired sensing data is transferred, the method can end 912.

Figure 10:
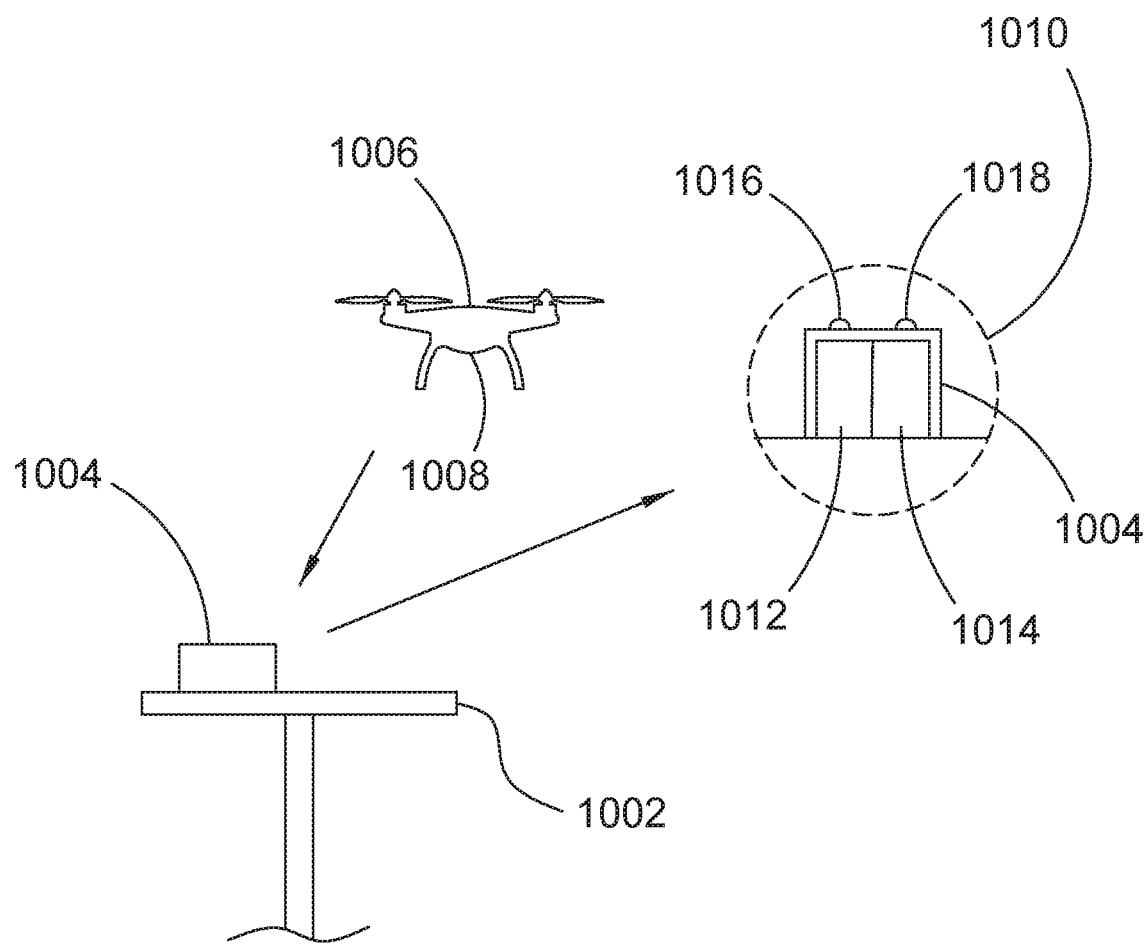
FIG. 10 is a diagram illustrating a battery changing operation at a remote sensor system by an autonomous drone, in accordance with some embodiments.

FIG. 10 is a diagram illustrating a battery changing operation at a remote sensor system 1000 by an autonomous drone 1006, in accordance with some embodiments. The remote sensor system includes a drone platform 1002 such at that illustrated in FIG. 2 that includes a raised battery housing 1004. The raised battery housing 1004 holds a battery above the platform 1002. Detail 1010 shows a front view of the battery housing 1004 in which there is a first battery slot 1012 and a second battery slot 1014. One of the slots 1012, 1014 can hold an old battery in need of being replaced. The drone 1006 can carry a spare fresh battery 1008 in a battery changing apparatus of the drone, and, upon arriving at the site of the remote sensor system 1000 and establishing communication with the remote sensor system 1000, can determine whether the present battery needs to be replaced. If so, the drone 1006 can determine which slot 1012, 1014 hold the old battery. Using alignment markers 1016, 1018 over respective slot locations, the drone can position itself to insert the new battery into the empty slot, and then reposition itself to remove the old battery. An articulated actuator can be used to urge the new battery into position, and aligning features in the slots 1012, 1014 can be provide that ensure the batteries are guided into place to make contact with connectors. The same articulating actuator can be used to remove and retain the old battery for return to a base. In order accomplish the battery change, the drone 1006 can include a lateral facing camera in order to visually detect the slot alignment markers 1016, 1018. Embodiments can provide other configurations of battery slots on the remote sensor and the drone and the battery exchange sequences: for example, the drone can hold multiple batteries; or the drone can have empty slots for batteries whereinto it can retrieve a sensor's old battery before installing a new battery into the sensor, which thus allows the sensor to operate with just one battery slot or to have multiple batteries with all slots occupied.

Figure 11:
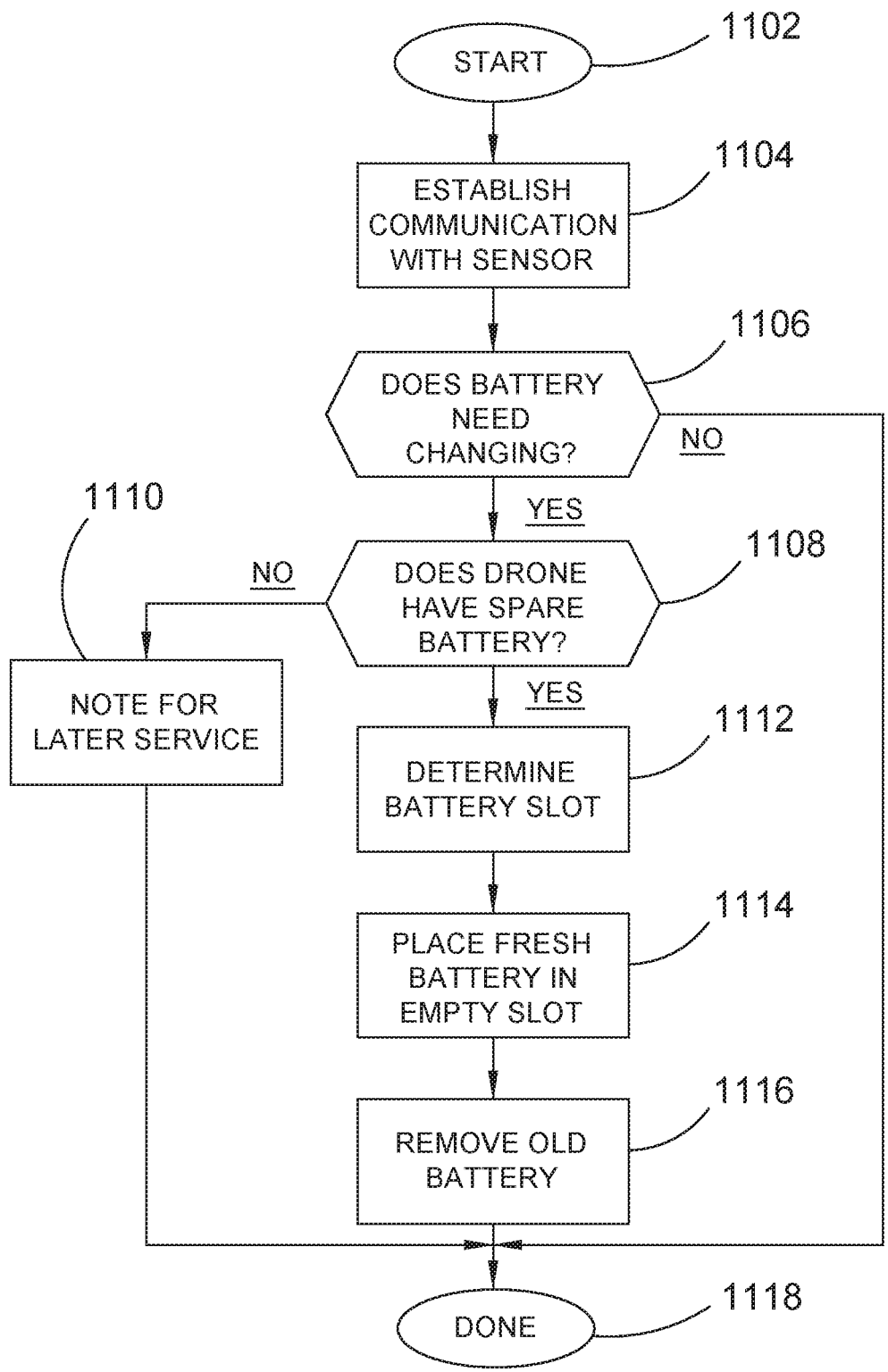
FIG. 11 is a flow chart diagram of a method for changing a battery of a remote sensor system by an autonomous drone, in accordance with some embodiments.

FIG. 11 is a flow chart diagram of a method 1100 for changing a battery of a remote sensor system by an autonomous drone, in accordance with some embodiments. The method 1100 can be performed as part of a routine visit to a remote sensor system site, and can be performed in conjunction with the sensor data transfer from the remote sensor to the autonomous drone. At the start 1102 an autonomous drone has arrived at the location of a remote sensor system. In step 1104 the autonomous drone establishes communication with the remote sensor system using a short range radio communication protocol as indicated, for example, in method 800 of FIG. 8. As part of the communication, the remote sensor system can indicate in step 1108 whether its battery needs to be changed. This information can be transmitted as a matter of routine, or in response to a specific query by the autonomous drone. Circuitry and software at the remote sensor system can track battery status and determine whether the battery is at risk of failing. When no battery issue is found, presently, the method 1100 can proceed from step 1106 directly the end 1118. However, when there is a potential battery issue detected, then in step 1108 the method 1100 can determine whether the autonomous drone is carrying a spare fresh battery. If the drone does not have an available replacement, then the drone can create a record or other data indication that the battery for the particular remote sensor system needs service/replacement in step 1110 and then the method 1100 will finish. When the drone does have a suitable replacement battery, then in step 1112 the drone can replace the old battery with the new battery. In some embodiments this can be performed using a battery housing such as battery housing 1004 of FIG. 10, where, in step 1112, the drone determines which battery slot of the housing is open. The remote sensor system can indicate which slot is occupied and which slot is open in the communication of step 1104, or at another point in the process. Upon determining the open slot, the drone can then line up the fresh battery and place it into the open slot in step 1114. In step 1116, then, the drone can reposition itself to remove the old battery.

The disclosed embodiments provide for a remote sensor system that can be used in a variety of applications to sense and collect data, particularly in locations where conventional cellular data networks lack coverage. In order to keep the cost of the remote sensor system low, rather than use high power radio transmitters, or dispatching personnel to remote sensor locations to collect data, the remote sensor systems can be built with low power conventional wireless local area network transmitters, and autonomous drones can be dispatched to fly to one or more remote sensor system locations to collect the sensor data records. This provides the benefit of reduced cost of operating a remote sensor system in both equipment costs and personnel time.

What is claimed is:

1. A method for retrieving sensor data from a remote sensor, comprising:
   providing a drone base;
   providing at least one remote sensor at a geographic location that is remote to the drone base, the at least one remote sensor having a sensor that produces sensor data that is stored at the at least one remote sensor as a most recent sensing data record;
   providing an autonomous drone aircraft with a geo-location of the at least one remote sensor, wherein the at least one remote sensor is fixed in place at the geo-location, and further providing the autonomous drone aircraft with a digital authentication key that corresponds to the at least one remote sensor;
   the autonomous drone aircraft flying to the geo-location autonomously;
   the at least one remote sensor at the geo-location sensing a presence of the autonomous drone aircraft by the at least one remote sensor detecting a sound of the autonomous drone aircraft that is produced by rotors of the autonomous drone aircraft;
   in response to sensing the presence of the autonomous drone aircraft, the at least one remote sensor waking up a local wireless network radio transceiver;
   establishing a communication link between the autonomous drone aircraft and the at least one remote sensor using the local wireless network radio transceiver of the at least one remote sensor and a local wireless network radio transceiver of the autonomous drone aircraft, including the autonomous drone aircraft transmitting the digital authentication key to the at least one remote sensor;
   transmitting the most recent sensing data record to the autonomous drone aircraft wherein the most recent sensing data record is then stored in the autonomous drone aircraft, wherein the at least one remote sensor verifies the digital authentication key prior to transmitting the most recent sensing data record; and
   the autonomous drone aircraft returning autonomously to the drone base.

2. The method of claim 1, wherein sensing the presence of the autonomous drone aircraft comprises the at least one remote sensor detecting a light signal from the autonomous drone aircraft.

3. The method of claim 1, wherein sensing the presence of the autonomous drone aircraft comprises the at least one remote sensor detecting a radio signal from the autonomous drone aircraft.

4. The method of claim 1, wherein the autonomous drone aircraft flying to the geo-location comprises:
   upon arriving at the geo-location, the autonomous drone aircraft using a downward-facing camera and visually recognizing a marker associated with the at least one remote sensor; and
   the autonomous drone aircraft positioning the autonomous drone aircraft over the marker.

5. The method of claim 4, wherein the marker is disposed on a platform, the method further comprises landing, by the autonomous drone aircraft, on the platform.

6. The method of claim 5, further comprising:
   upon landing on the platform, the autonomous drone aircraft replacing a battery of the at least one remote sensor.

7. The method of claim 1, further comprising:
   the autonomous drone aircraft confirming, to the at least one remote sensor, that a prior sensing data record has been recorded; and
   the at least one remote sensor discarding the prior sensing data record from a memory of the at least one remote sensor.

8. The method of claim 1, further comprising transmitting, from the at least one remote sensor to the autonomous drone aircraft, a present sensor status data record.

9. A method for retrieving sensor data from a remote sensor by an autonomous drone aircraft, comprising:
   providing the autonomous drone aircraft with a geo-location of at least one remote sensor at a drone base, wherein the at least one remote sensor is fixed in place at the geo-location;
   providing a digital authentication key to the autonomous drone aircraft that corresponds to the at least one remote sensor;

response to providing the geo-location of the at least one remote sensor, while the autonomous drone aircraft is at the drone base, the autonomous drone aircraft determining whether, based on a present battery charge and a present geo-location of the autonomous drone aircraft and the geo-location of the at least one remote sensor, the autonomous drone aircraft can fly to the at least one remote sensor and then return to the drone base;

when the autonomous drone aircraft has determined that the autonomous drone aircraft can fly to the at least one remote sensor and return to the drone base the autonomous drone aircraft, flying to the geo-location;

upon flying to the geo-location of the at least one remote sensor, the at least one remote sensor detecting a presence of the autonomous drove aircraft based on the at least one remote sensor detecting a sound of the autonomous drone aircraft that is produced by rotors of the autonomous drone aircraft, and in response, the at least one remote sensor transmitting an indication of detecting the autonomous drone aircraft to the autonomous drone aircraft;

receiving from the at least one sensor at the autonomous drone aircraft, the indication that the at least one remote sensor has detected the autonomous drone aircraft;

upon receiving the indication that the at least one remote sensor has detected the autonomous drone aircraft, the autonomous drone aircraft establishing a communication link between the autonomous drone aircraft and the at least one remote sensor using a local wireless network radio transceiver of the autonomous drone aircraft by transmitting the digital authentication key to the at least one remote sensor;

responsive to transmitting the digital authentication key, the autonomous drone aircraft receiving a most recent sensing data record stored at, and produced by, the at least one remote sensor, wherein the most recent sensing data record is then stored in the autonomous drone aircraft; and the autonomous drone aircraft returning to the drone base.

10. The method of claim 9, further comprising, prior to establishing the communication link, the autonomous drone aircraft providing a light signal to the at least one remote sensor to cause the at least one remote sensor to activate a local wireless network radio transceiver of the at least one remote sensor.

11. The method of claim 9, further comprising, prior to establishing the communication link, the autonomous drone aircraft providing a radio signal to the at least one remote sensor to cause the at least one remote sensor to activate a local wireless network radio transceiver of the at least one remote sensor.

12. The method of claim 9, wherein the autonomous drone aircraft flying to the geo-location comprises:

upon arriving at the geo-location, the autonomous drone aircraft using a downward-facing camera and visually recognizing a marker associated with the at least one remote sensor; and the autonomous drone aircraft positioning itself over the marker.

13. The method of claim 12, wherein the marker is disposed on a platform, the method further comprises landing, by the autonomous drone aircraft, on the platform.

14. The method of claim 9, further comprising:

upon establishing the communication link, the autonomous drone aircraft transmitting to the at least one remote sensor an indication that a prior sensing data record has not been correctly processed; and receiving the prior sensing data record from the at least one remote sensor.

15. The method of claim 9, further comprising:

the autonomous drone aircraft confirming, to the at least one remote sensor, that a prior sensing data record has been recorded.

16. The method of claim 9, further comprising receiving, at the autonomous drone aircraft, a present sensor status data record.

17. The method of claim 9, wherein, upon autonomous drone aircraft determining whether the autonomous drone aircraft can fly to the at least one remote sensor and return to the drone base, the autonomous drone aircraft initially determining that the autonomous drone aircraft cannot fly to the at least one remote sensor based on the present battery charge, and then waiting until the present battery charge is sufficient to fly to the at least one remote sensor and return to the drone base before flying to the at least one remote sensor.

* * * * *